March 7, 1939.  E. KRENZLER  2,149,919
SHAPING MACHINE
Filed April 28, 1937   2 Sheets-Sheet 1

Inventor:
Emil Krenzler,
by Frank S. Appleman,
attorney.

March 7, 1939.   E. KRENZLER   2,149,919
SHAPING MACHINE
Filed April 28, 1937   2 Sheets-Sheet 2

Patented Mar. 7, 1939

2,149,919

UNITED STATES PATENT OFFICE 2,149,919

SHAPING MACHINE

Emil Krenzler, Wuppertal-Barmen, Germany

Application April 28, 1937, Serial No. 139,594
In Germany April 25, 1936

3 Claims. (Cl. 90—38)

The invention relates to a rapid shaping machine for work on metals with the ram thereof movable only forwards and backwards. The clamping table carrying the work is adjustable vertically and horizontally. With the machines of this class generally known, the ram may be running in comparatively long strokes or slides. Such slides, however, do not extend down to the part of the ram supporting the tool. Consequently, with rams supported in this overhanging fashion, the stresses to which the machines are subjected are extremely high varying according to the hardness of the material being machined, the feed and the cutting speed and, especially, the stroke. As a matter of course it will be understood that the accuracy as well as the quality of the surface machining on the work must be affected by the vibrations occurring and the yielding of the ram which occur more especially in instances where the cutting capacity of the machines is taxed to the limit with the modern high speed steels and alloys such as Widia, etc. Efforts have been made to overcome these disadvantages by extending the slides of the ram further ahead beyond the body of the machine. While in this way the ram receives a better support, what cannot be prevented is that the overhanging parts of the ram slide are bent aside slightly under the counter-pressure of the ram and the working efficiency as well as the accuracy of the machine will be affected thereby.

Apart from the fact that the efficiency of the machine is impaired by the insufficient rigidity of the ram, a further impairment results from the arrangement of the clamping table. For holding the clamping table, generally only a single vertical carriage is provided on the front side of the machine. Such a unilateral hold or slide for the table is unfavorable in itself for the reason that the free end of the table sags a little owing to the weight of the table. It will be understood, of course, that the table with its unsupported end is pressed down by the working pressure of the tool and becomes resilient. With some types of machines the spindle for the stroke has been placed underneath the plate of the table to reduce the degree of resiliency. This is only partly satisfactory, however, because the effective range of the spindle is but small and by any too tight or too loose adjustment of the spindle, the result obtained may be exactly contrary. Furthermore, with a view to improving upon the rigidity of the table trials have been made with an angular support mounted on the base plate of the machine to which the forward end of the clamping table would be screwed, the angular support being provided with oblong screw holes vertically for the screws and imparting to the table a guiding within limits. However, this is only short and inexact and, in addition, every time the table is lowered or lifted it must be fixed anew by tightening a number of screws. While with the employment of supports of that kind, the resiliency of the table may be reduced to a certain extent, such a support does not give any guarantee as regards the accurately horizontal position of the table which is essential. Apart from that, manipulation is quite awkward.

The purpose of the present invention is to eliminate these disadvantages in such a way that the slides for the ram on the machine body are prolonged to a point of support designed in a well known fashion as supplementary clamping table slides so that a compact machine frame is created. To advantage, the guide part which is extended towards the front and resting on the support is situated above the head of the ram without any change in the construction of the frame. It will be advantageous, furthermore, to bring the gearing for the adjustment of the tool support up to the side wall of the ram.

By reason of this design, the new high speed planer combines maximum working accuracy with high capacity, because the disadvantages of the insufficiently supported ram formerly used are eliminated by the guide supporting the ram with the ram head holding the tool all along its course which cannot be forced off direction owing to the fact that it is made fast to the support. On the other hand, inasmuch as the supporting column serving to hold the slides for the ram represent a supplementary vertical guide for the clamping table simultaneously, not only the resiliency of the table has been eliminated but, in addition, the perfectly horizontal position of the table is secured. With a frame structure of that kind, the machine will now stand up under the most severe conditions, the rigidity of the frame helping to increase the accuracy of the work produced. With all this, the operation of the new machine is by no means more difficult because, for one thing, the work itself may be seen over its full extension and for another, the adjustment of the shaping tool to the proper depth of cut is very easy for the reason that the hand wheel for raising and lowering the support is located laterally on the side of the ram.

By way of example, the invention is illustrated in the annexed drawings,

Fig. 1 being a lateral view of the new rapid shaper;

Figure 1:
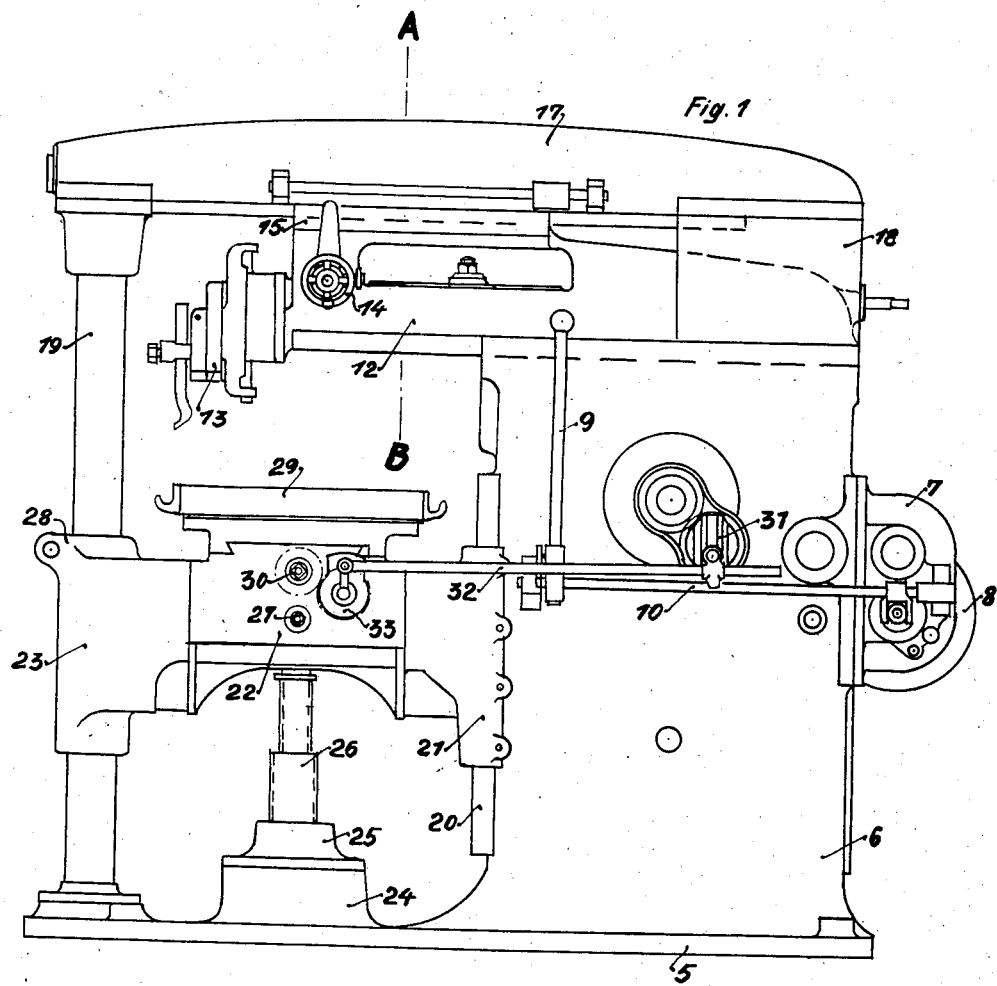
Figure 2:
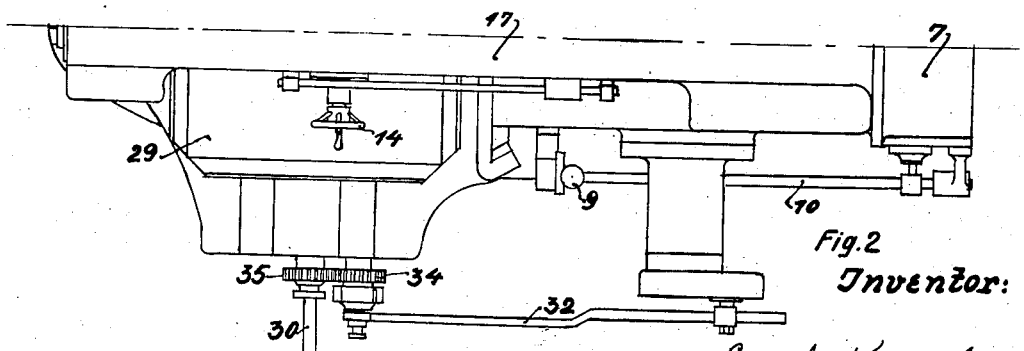
Fig. 2 is a partial plan view.
Figure 3:
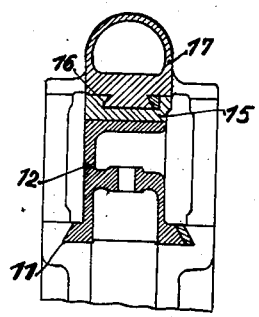
Fig. 3 represents a section along line A—B, Fig. 1, through the ram and its slide.
Figure 4:
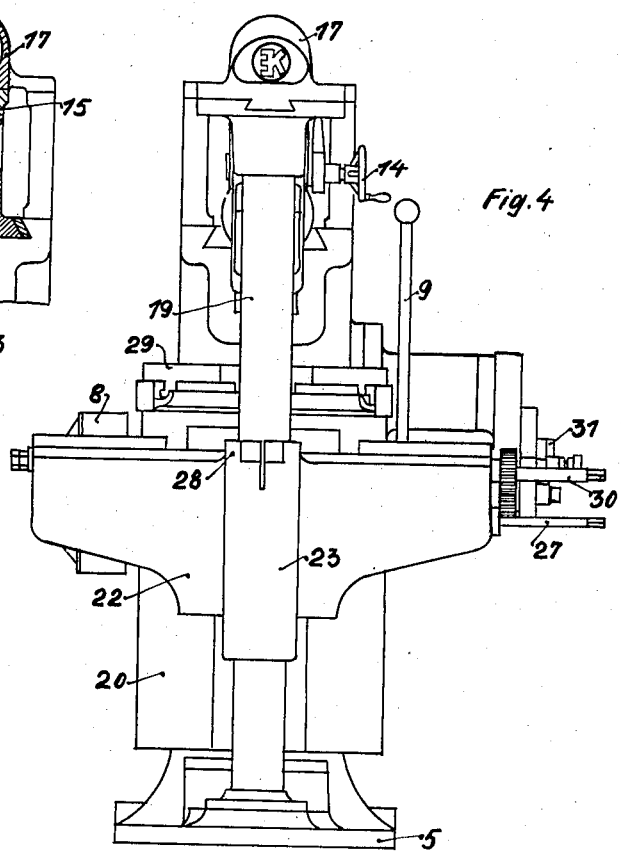
Fig. 4 is a front view of the new planing machine, or shaper.

At the one end of a base plate 5 a machine body 6 is mounted supporting on the rear side a gear box 7 with the driving gear 8. The drive may be engaged or disengaged by means of lever 9 and the connecting rod 10. In the upper part of the machine body 6 a slide 11 has been provided for the movement of a ram 12. On the forward end of the ram 12 a slide 13 is mounted for receiving the shaping tools which is adjustable vertically, hand wheel 14 located laterally of ram 12 serving for that purpose. The back or top of the ram 12 is provided with an elongated boss 15 commencing at the front of the ram 12 and extending rearwardly over more than half the length of the ram, this boss having a dove-tail shaped groove 16 machined in it. This groove 16 serves to guide the ram 12 along a dove-tail slide 17 which is supported by or fixed at one end to a support 18 at the back of machine body 6 and fastened at the other end to a supporting column 19 mounted on the forward end of base plate 5.

On the front side of machine body 6, a broad vertical slide 20 has been provided on which the carriage-like end 21 of the lower part 22 of a clamping table moves. The other end 23 of the lower part of the table is of tubular shape and slides on the column 19.

For the purpose of moving the lower part 22 of the clamping table upwards and downwards, a hollow cast body 24 has been provided on base plate 5, with a nut 25 and a telescopic spindle 26 of a plurality of parts being actuated by a spindle 27. The tubular end 23 of the lower part of the clamping table has been designed for clamping to the column 19 at its upper end 28 whereby the telescopic spindle 26 may be relieved of the weight of the table 22 after an adjustment has been effected.

A clamping table 29 has been provided on the lower part 22, adjustable in a direction parallel to the face side of machine body 6. A spindle 30 has been provided for the rapid adjustment of the clamping table 29, while for the automatic feed that may be regulated within certain limits, a control mechanism has been provided consisting of crank disk 31, connecting rod 32, ratchet wheel 33 and feed gears 34 and 35.

It is understood, of course, that the invention is not limited to the construction described by way of example, other arrangements and variations being possible.

I claim:

1. In a high speed shaping machine having a ram mounted for sliding movement over the work upon a guide formed on an upper surface of said machine, said guide having a sliding engagement with the under surface of said ram, tool mounting means carried by one end of said ram, a second guide parallel to said first guide, said tool mounting means and said guides all being in vertical alinement to prevent yielding of said ram in an upward direction during the cutting stroke thereof, means on said machine supporting said second guide at both ends thereof, said means also providing means for adjustably mounting said work beneath said ram, an elongated boss formed on said ram, said boss being formed to provide a groove therein, said groove engaging said second guide to provide a supplementary support and guide for said ram.

2. In a high speed shaping machine having a ram mounted for sliding movement over the work upon a guide formed on an upper surface of said machine, said guide having a sliding engagement with the under surface of said ram, tool mounting means carried by one end of said ram, a second guide parallel to said first guide, said tool mounting means and said guides all being in vertical alinement to prevent yielding of said ram in an upward direction during the cutting stroke thereof, means on said machine supporting said second guide at both ends thereof, means adjustably mounted on said supporting means for adjustably positioning said work beneath said ram, an elongated boss formed on said ram, said boss being formed to provide a groove therein, said groove engaging said second guide to provide a supplementary support and guide for said ram, said second guide being positioned above said ram, and said grooved boss being positioned on top of said ram.

3. In a high speed shaping machine having a ram mounted for sliding movement over the work upon a guide formed on an upper surface of said machine, said guide having a sliding engagement with the under surface of said ram, a second guide parallel to said first guide, means on said machine supporting said second guide at both ends thereof, means adjustably mounted on said supporting means for adjustably positioning said work beneath said ram, an elongated boss formed on said ram, said boss being formed to provide a groove therein, said groove engaging said second guide to provide a supplementary support and guide for said ram, said second guide being positioned above said ram, and said grooved boss being positioned on top of said ram, an adjustable tool carrier mounted on one end of said ram beneath said second guide, said tool mounting means and said guides all being in vertical alinement to prevent yielding of said ram in an upward direction during the cutting stroke thereof, and means mounted on a side of said ram for accurately adjusting said tool carrier.

EMIL KRENZLER.